United States Patent
Zatloukal et al.

(10) Patent No.: US 7,210,138 B2
(45) Date of Patent: Apr. 24, 2007

(54) SYSTEM AND METHOD FOR PERFORMING ERROR RECOVERY IN AN INTEGRATED DEVELOPMENT ENVIRONMENT

(75) Inventors: Kevin Zatloukal, Cambridge, MA (US); Tim A. Wagner, Seattle, WA (US)

(73) Assignee: BEA Systems, Inc., San Jose, CA (US)

( * ) Notice: Subject to any disclaimer, the term of this patent is extended or adjusted under 35 U.S.C. 154(b) by 512 days.

(21) Appl. No.: 10/678,344

(22) Filed: Oct. 3, 2003

(65) Prior Publication Data

US 2005/0015676 A1    Jan. 20, 2005

Related U.S. Application Data

(60) Provisional application No. 60/488,330, filed on Jul. 18, 2003.

(51) Int. Cl.
G06F 9/44    (2006.01)

(52) U.S. Cl. .................. 717/143; 717/140

(58) Field of Classification Search ............ 717/143, 717/140; 714/52
See application file for complete search history.

(56) References Cited

U.S. PATENT DOCUMENTS

| | | | | |
|---|---|---|---|---|
| 4,989,145 A | * | 1/1991 | Kyushima | ............ 704/9 |
| 5,487,147 A | * | 1/1996 | Brisson | ............ 714/1 |
| 6,886,115 B2 | * | 4/2005 | Kondoh et al. | ............ 714/52 |
| 2003/0101441 A1 | * | 5/2003 | Harrison et al. | ............ 717/152 |

OTHER PUBLICATIONS

Aho, Alfred, et al., "Compilers: Principles, Techniques, and Tools," Pearson Education, pp. 1-796, ISBN 81-7808-046-X, Mar. 1986.

Thesis by: Wagner, Tim A., "Practical Algorithms for Incremental Software Development Environments," Mar. 10, 1998, pp. 1-133.

* cited by examiner

*Primary Examiner*—Tuan Dam
*Assistant Examiner*—Isaac Tecklu
(74) *Attorney, Agent, or Firm*—Fliesler Meyer LLP

(57) ABSTRACT

A system and method for compiler error recovery, comprising analyzing the syntactic structure of a first program in a first programming language, wherein the first program can be represented by a first set of tokens, detecting a syntax error in the first program, remedying the syntax error by adding at least one token to the first set of tokens according to one of: 1) a prefix definition; and 2) an idiom definition, and wherein the detection of the syntax error occurs at the behest of an extensible compiler framework.

32 Claims, 7 Drawing Sheets

SYSTEM AND METHOD FOR PERFORMING ERROR RECOVERY IN AN INTEGRATED DEVELOPMENT ENVIRONMENT

CLAIM OF PRIORITY

This application claims priority from the following application, which is hereby incorporated by reference in its entirety:

SYSTEM AND METHOD FOR PERFORMING ERROR RECOVERY IN AN INTEGRATED DEVELOPMENT ENVIRONMENT, U.S. Application Ser. No. 60/488,330, Inventors: Zatloukal, et al., filed on Jul. 18, 2003.

CROSS-REFERENCE TO RELATED APPLICATIONS

This application is related to the following co-pending application which is hereby incorporated by reference in its entirety:

SYSTEM AND METHOD FOR PERFORMING CODE COMPLETION IN AN INTEGRATED DEVELOPMENT ENVIRONMENT, U.S. application Ser. No. 10/678,248, Inventors: Kevin Zatloukal, et al., filed on Oct. 3, 2003.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

The present invention disclosure relates to compiler design, and in particular, error recovery and code completion.

BACKGROUND

Some integrated software development environments (IDEs) provide a feature referred to as code completion. Generally speaking, code completion is a facility that aids software developers by offering suggestions and/or information applicable to the completion of expressions or statements in a given programming language or paradigm. For example, in the Java™ programming language after a programmer enters an identifier name followed by a dot ('.') in a source code editor, code completion could present the programmer with a list of all possible valid names that could follow the dot. This saves the programmer the inconvenience of having to refer to the one or more source code files to determine the correct information. Another example of code completion involves function or method calls. When a programmer types a function/method name in a source code editor, the programmer can be presented with a template of arguments for the function/method, and if there is more than one function/method with the given name, the programmer could be presented with a list of such templates to chose from. When there is only one possible way to complete a given language statement/expression, code completion can simply inscribe the requisite code directly into the source code editor.

Typically, IDEs are implemented using two parsers. One parser is engaged to determine types and methods. A second parser is invoked when code completion is required. The second parser gathers information, typically in the form of a parse tree, by which a code completion facility can determine possible completions of a given expression/statement. This arrangement is inherently inefficient, however, since two parsers are required by an IDE supporting this feature and since a given range of source code will be parsed more than once. An additional consideration in implementing a code completion system is the robustness of error recovery. In an IDE source code editor, statements/expressions are often in an incomplete and improper (from a language definition standpoint) grammatical state. Since code completion depends heavily on information generated by a parser, parsers that do not recover well from errors will hamper this functionality.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
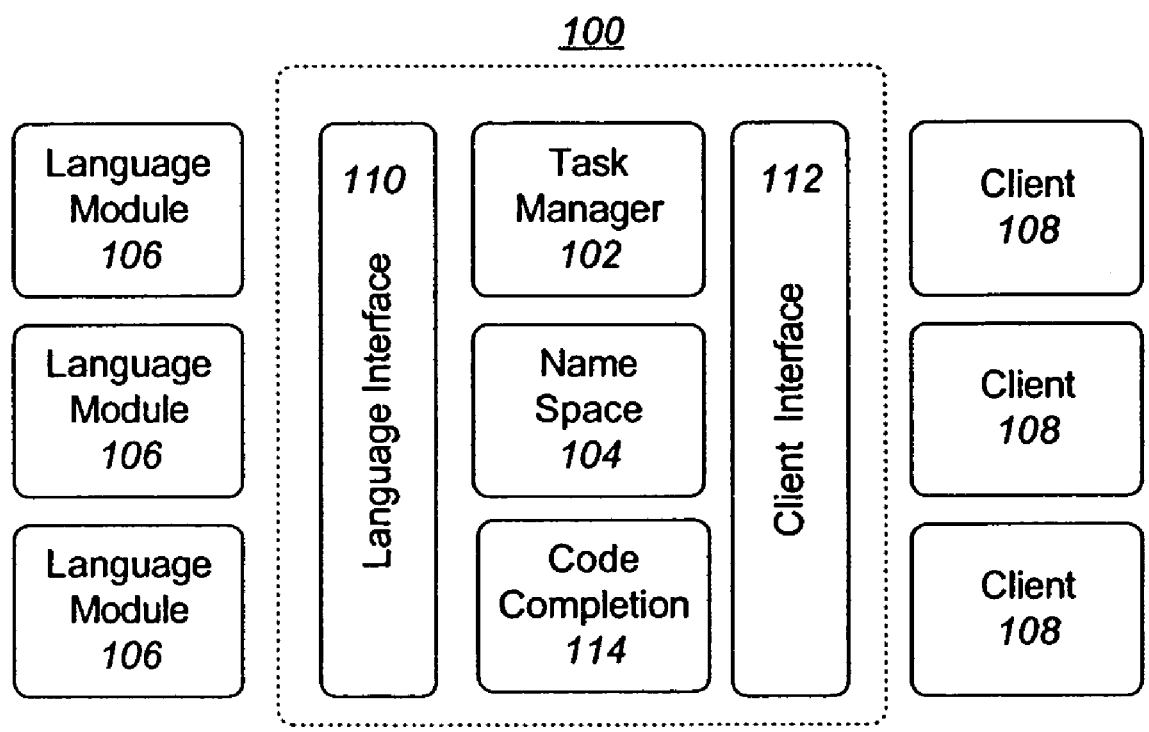
FIG. 1 is an illustration of a compiler framework for interactive software development in an embodiment.

FIG. 1 is an illustration of a compiler framework for interactive software development in an embodiment. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, a language-neutral, extensible compiler framework 100 can provide compilation and related services to one or more clients 108. By way of a non-limiting example, a client can be an IDE, other compiler framework, and/or other suitable program/tool. Clients can interact with the framework through client interface 112. One or more language modules 106 can implement language-specific features, such as parsing, compilation and code generation for a given language (e.g., Java™, C#, eXtensible Markup Language, etc.). Language modules can interact with and provide services to the framework through language interface 110. Since the framework accommodates multiple language modules, clients can utilize it for projects containing more than one programming language. In one embodiment, a client can cause the framework to request the services of one or more language modules by informing the framework of changes to source code (e.g., as a result of editing), among other things. Upon receiving such notification, the framework determines what source code files are affected by the changes and in what order to recompile them such that any dependencies are satisfied. Tasks to perform recompilation are managed by task manager 102. Recompilation tasks can be multithreaded and can invoke the services of the language module(s) through the language interface. The framework can also provide clients with code completion services through a code completion module 114. The client and language interfaces can be implemented in a number of ways including, but not limited to, as application program interfaces, service provider interfaces, shared memory, communication protocols, distributed objects, data structures, and other suitable means without departing from the spirit and scope of the present disclosure.

Figure 2:
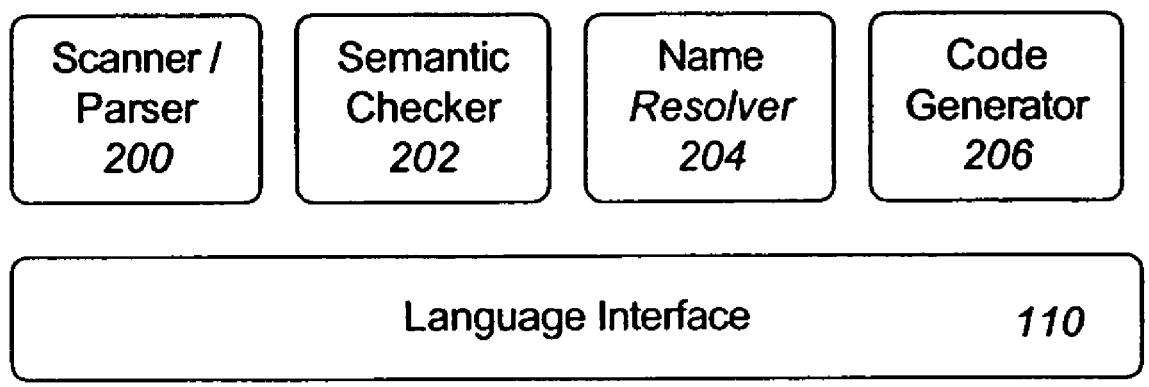
FIG. 2 is an illustration of a language module in accordance to one embodiment.

FIG. 2 is an illustration of a language module in accordance to one embodiment. Language modules can provide language-specific functionality, such as parsing, semantic checking, name resolution and code generation to the framework 100. The framework includes a scanner/parser component 200 which can provide scanning/parsing services to the framework. The scanner/parser component can operate in an incremental fashion, a batch fashion or some combination thereof. A scanner generally splits expressions and language statements into tokens which can then be processed by a parser in order to discover the grammatical structure of a program. In doing so, the parser can generate a parse tree or other representation of the program. The present disclosure is not limited to textual programming languages. In one embodiment, a programming language can be graphical in nature (e.g., a program can be represented by graphical depictions and associations there between). As will be apparent to one of skill in the art, such graphical depictions and associations can be mapped into a linear programming language which can then be processed by the scanner/parser component.

The framework includes a name space component 104 which can be used by language components to store symbols (e.g., identifiers, types), and to perform name resolution 204 and dependency checking. In one embodiment language modules can utilize the symbol information of other language modules (e.g., when multiple languages interact). In addition, the symbol information in a parse tree can refer to corresponding entries in the name space. The semantic checker component 202 can perform semantic checking of the program. Semantic checking can catch errors that are not discernable from the syntactic structure of a program. Code generator 206 can translate a representation of the language parsed by the scanner/parser to a target language. By way of a non-limiting example, the target language can be low-level (e.g., machine code), intermediate (e.g., Java byte code), or high-level (e.g., another programming language). In one embodiment, the target language for all language modules is the same.

Figure 3:
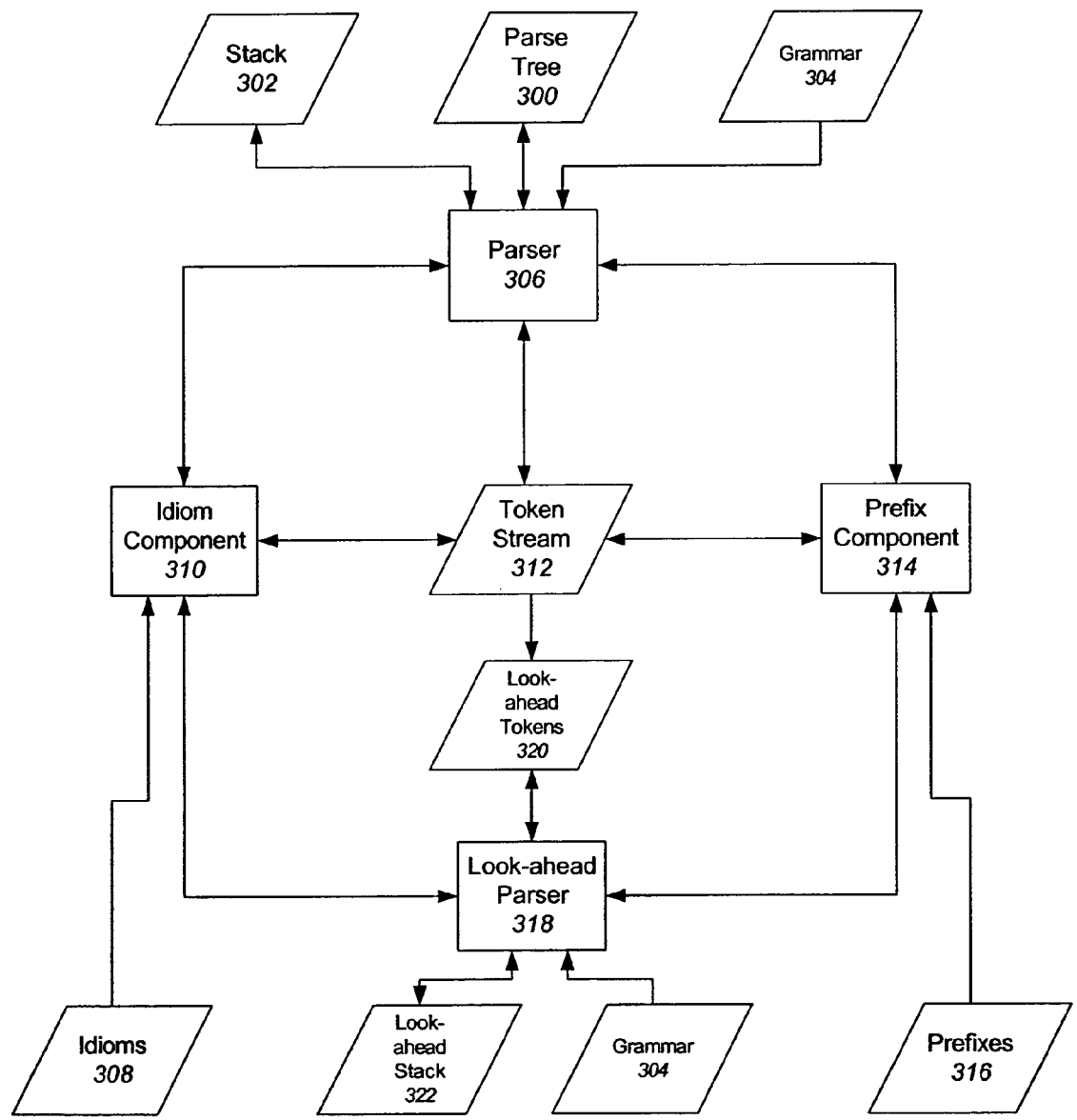
FIG. 3 is an illustration of a parser with improved error recovery in accordance to one embodiment.

FIG. 3 is an illustration of a parser with improved error recovery in accordance to one embodiment. Although this diagram depicts components as functionally separate, such depiction is merely for illustrative purposes. It will be apparent to those skilled in the art that the components portrayed in this figure can be arbitrarily combined or divided into separate software, firmware or hardware components. Furthermore, it will also be apparent to those skilled in the art that such components, regardless of how they are combined or divided, can execute on the same computing device, multiple computing devices, or can be arbitrarily distributed among different computing devices connected by one or more networks.

Referring to FIG. 3, parser 306 consumes tokens from the token stream 312 and generates parse tree 300. In this endeavor, the parser utilizes language grammar 304 (e.g., an LALR(1), LL(1), etc.) which provides the syntax rules for properly formed language statements. The parser can operate in an incremental fashion, a batch fashion or some combination thereof. By way of a non-limiting example, the parser can be table-driven such that successive grammar states are encoded into a matrix that drives token consumption. Other parser implementations are possible and well known in the art. The present invention is not limited to or dependent on a particular parser implementation. Parse stack 302 is used by the parser to keep track of where in the grammar a particular sequence of input tokens has led it. In one embodiment, the top of the stack represents the current parse state and states preceding it are on the stack in order of most recent (closest to the top of the stack) to least recent.

In one embodiment, when the parser detects a syntax error it can invoke a number of error recovery mechanisms. Two possible error recovery mechanisms are embodied in prefix component 314 and idiom component 310, respectively. These components will be discussed in detail below. Both components attempt to "fix" an invalid or incomplete language statement by introducing new tokens into the token stream and/or by altering the parse stack so that the parser can continue past the error. The prefix component tries to introduce prefix/terminator combinations whereas the idiom component attempts to introduce specific token sequences that fix commonly occurring errors in a given language.

In one embodiment, the idiom and prefix components can make use of a look-ahead parser 318 which in turn can make use of a look-ahead token buffer 320 and a look-ahead stack 322. The look-ahead token buffer and look-ahead stack can be used by the look-ahead parser to perform trial parses on "fixes" introduced by error recovery mechanisms to determine if the parser can get beyond a given syntax error. If an error is remedied, any new information in the look-ahead stack and look-ahead token buffer can be transferred to the stack and token stream, respectively. This will allow the parser to pick up where it left off and get beyond the syntax error. In one embodiment, the number of tokens in the look-ahead buffer is equal to the number of tokens introduced by an error recovery mechanism plus a minimum number of tokens that the parser is required to consume in order to be considered free and clear of the error condition. In one embodiment, the minimum number of tokens is three. In one embodiment, the parser and the look-ahead parser are the same.

Figure 4:
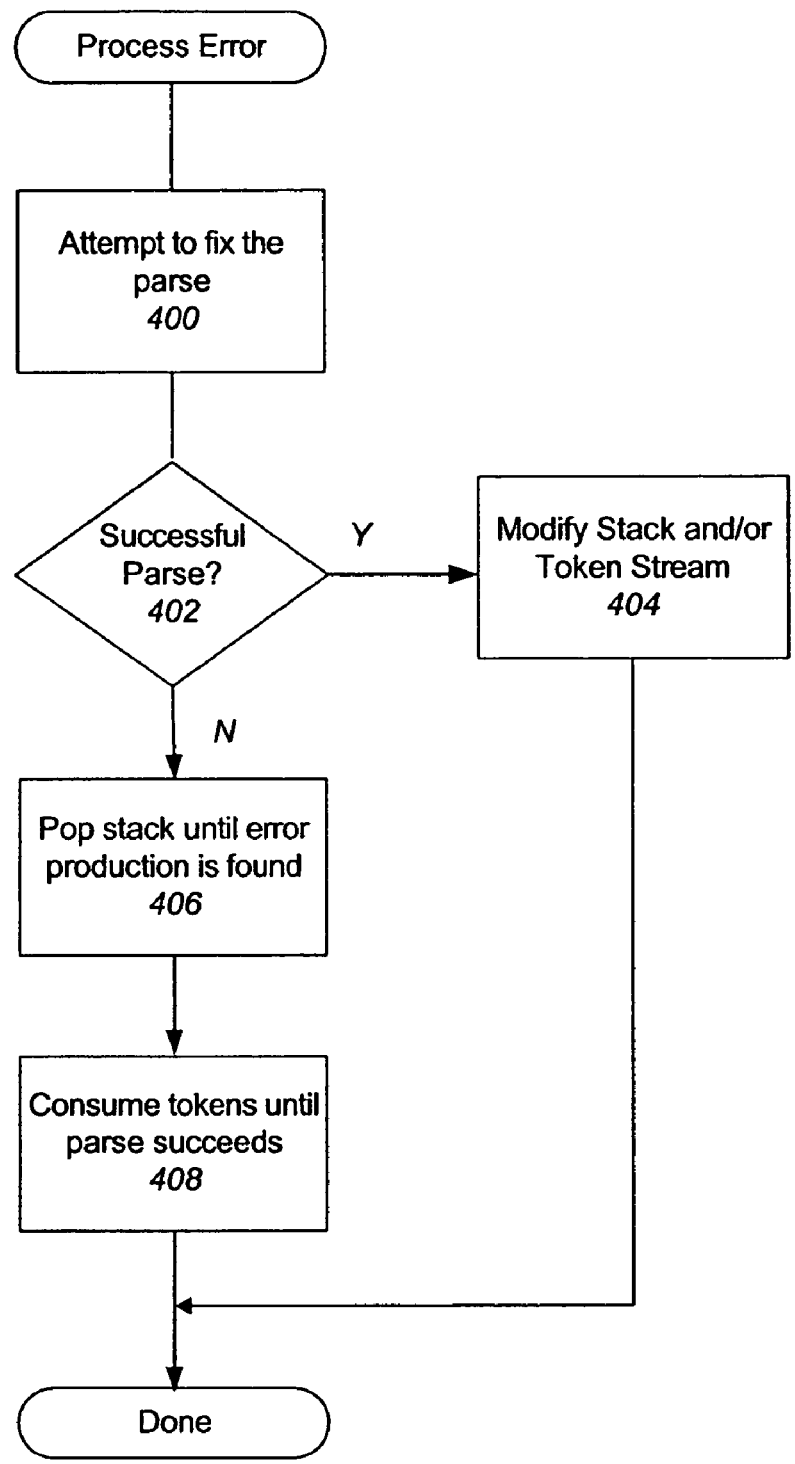
FIG. 4 is an illustration of parser error recovery in accordance to an embodiment.

FIG. 4 is an illustration of parser error recovery in accordance to an embodiment. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

In Step 400, attempts can be made to modify the token stream and/or stack of the parser to fix a syntax error. In one embodiment, a closing delimiter followed by a terminator can be introduced. The parser stack and the token stream can be examined for unmatched delimiter tokens. For example, if the opening delimiter characters '(', '{', and '[' were found, then one would expect to find matching closing delimiter characters ')', '}', and ']'. In the case of a missing closing delimiter, however, an appropriate closing delimiter token can be inserted onto the stack or into the token stream to fix the problem. The combination of an opening delimiter with an newly created closing delimiter is termed a prefix.

A language module can specify tokens that serve as opening and closing delimiters. A language module can also define special case rules. In one embodiment, and by way of a non-limiting example, there can be a rule for the Java language pertaining to the dot ('.') token. If the dot token is at the top of the stack, then it is considered an opening delimiter. The appropriate closing delimiter in this case is an identifier immediately following the dot. If such a closing delimiter is not found, error recovery can insert a dummy identifier token into the token stream.

Once a prefix has been established, error recovery attempts to pair it with a terminator token. In one embodiment, the terminator chosen depends on the prefix. By way of a non-limiting example, if a prefix ends with a closing delimiter of ')', then in the Java language a semicolon is a possible appropriate terminator since the ')' could be the end of a statement. By way of a second non-limiting Java example, if there is an empty prefix, error recovery can introduce a '+' token. That way if a user had typed "foo bar" (which is not legal in Java), the '+' in between "foo" and "bar" will create a syntactically valid expression. In yet another embodiment, a terminator can be empty. By way of another non-limiting Java example, error recovery can attempt to pair the prefix with a semicolon.

Still referring to Step 400, in another embodiment language-specific idioms can be introduced into the token stream and/or stack of the parser to fix a syntax error. An idiom is a specific insertion sequence that can be used to overcome common errors in a given programming language. By way of a non-limiting example, Table 1 lists several idioms that can be used in conjunction with common syntax errors in the Java language. In Table 1, "<id>" refers to a new dummy identifier.

TABLE 1

Java Idioms in one Embodiment

| JAVA SYNTAX ERROR | INSERTED IDIOM |
|---|---|
| missing identifier | <id> ; |
| malformed method call | <id> ) ; |
| malformed method call | <id> ) ; } |
| malformed declaration | <id> ; } |
| class body missing | <id> { } |
| "catch" missing | <id> ; } finally { } |
| "catch" missing | finally { } |
| "catch" missing | finally { } } |
| declarations outside class body | class <id> { |

In Step 402, a determination can be made as to whether error correction has enabled to the parser to continue past the syntax error. If so, the stack and/or token stream are modified in Step 404 to introduce the fix. If not, states can be popped off of the parse stack until an error production is removed. In one embodiment, an error production is defined by the grammar. By way of a non-limiting example pertaining to the grammar language in YACC (Yet Another Compiler Compiler), an error production (or rule) can be defined as follows:

```
stmt    ::= expr SEMI
        | while_stmt SEMI
        | if_stmt SEMI
        | error SEMI
```

This grammar rule for a language statement ("stmt") indicates that if a parse error ("error") is encountered during parsing one of the statement rules (i.e., "expr SEMI", "while_stmt SEMI" and "if_stmt SEMI"), the parser can get beyond it (and potentially recover) once a semicolon ("SEMI") token has been consumed. By way of a non-limiting example, tokens could be popped off of the stack until the "error" token is encountered. Then, excess tokens in the token stream could be consumed/discarded until parsing succeeds (Step 408).

In another embodiment, an additional error recovery technique that can be employed is to incorporate illegal language constructions into the grammar itself. This can be done assuming that the illegal grammar rules do not cause the grammar to become ambiguous.

Figure 5:
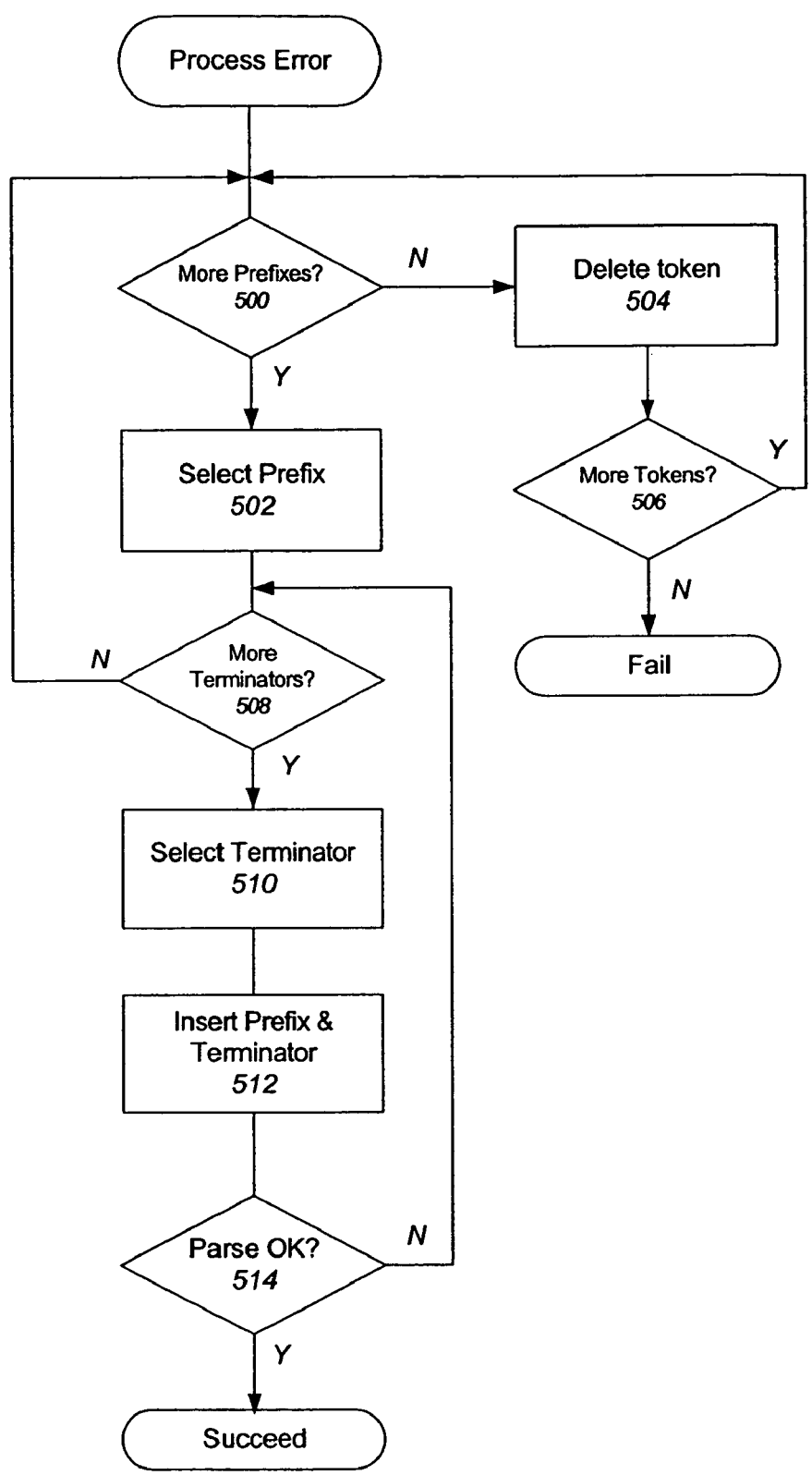
FIG. 5 is an illustration of prefix error recovery in one embodiment.

FIG. 5 is an illustration of prefix error recovery in one embodiment. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIGS. 3 and 5, in Step 500 a determination is made as to whether there are any more prefixes available to apply to the given syntax error. If not, a token is deleted from the look-ahead token buffer in Step 504. A determination is then made in Step 506 as to whether there are any more tokens left in the look-ahead token buffer. If no more tokens remain, prefix error recovery fails. Assuming there are more prefixes to try, a prefix is selected in Step 502. In Step 508, a determination is made as to whether there are any remaining terminators to pair with the selected prefix. If not, processing continues at Step 500. If there is another terminator to pair with the selected prefix, the terminator is selected in Step 510. In Step 512, the selected prefix/terminator pair is introduced into the look-head token buffer and/or look-ahead stack. In Step 514, a determination is made as to whether the look-ahead parser was able to successfully parse with the fix in place. If so, error recovery succeeds. Otherwise, processing continues at Step 508 where another terminator will be potentially paired with the selected prefix.

Figure 6:
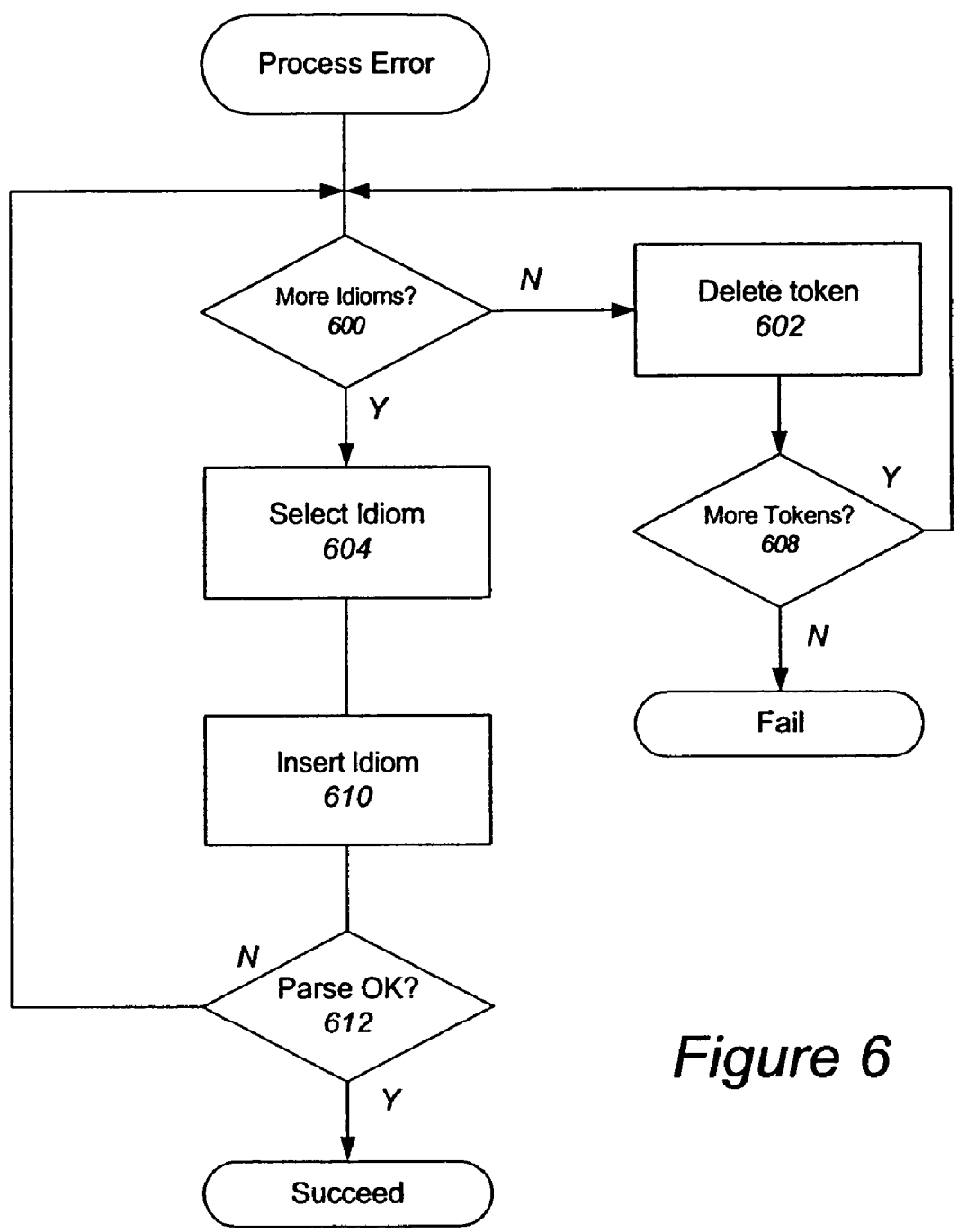
FIG. 6 is an illustration of idiom error recovery in one embodiment.

FIG. 6 is an illustration of idiom error recovery in one embodiment. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIGS. 3 and 6, in Step 600 a determination is made as to whether there are any remaining idioms left to apply to a given syntax error. If not, a token is deleted from the look-ahead token buffer in Step 602. A determination is then made in Step 608 as to whether there are any more tokens left in the look-ahead token buffer. If no more tokens remain, idiom error recovery fails. Assuming there are more idioms to try, an idiom is selected in Step 604. In Step 610, the selected idiom is introduced into the look-head token buffer and/or look-ahead stack. In Step 612, a determination is made as to whether the look-ahead parser was able to successfully parse with the fix in place. If so, error recovery succeeds. Otherwise, processing continues at Step 600 where another idiom will potentially be selected.

Robust parser error recovery as described above directly benefits code completion. Code completion is a facility that aids software developers by offering suggestions and/or information applicable to the completion of expressions or statements in a given programming language or paradigm. For example, in the Java™ programming language after a programmer enters an identifier name followed by a dot ('.') in a source code editor, code completion could present the programmer with a list of all possible valid names that could follow the dot. This saves the programmer the inconvenience of having to refer to the one or more source code files to determine the correct information to complete the statement/expression. Another example of code completion involves function or method calls. When a programmer types a function/method name in a source code editor, the programmer can be presented with a template of arguments for the function/method, and if there is more than one function/method with the given name, the programmer could be presented with a list of such templates to chose from. When there is only one possible way to complete a given language statement/expression, code completion can simply inscribe the requisite code directly into the source code editor.

In one embodiment and by way of a non-limiting example, the framework can make available code completion services to clients through the client interface. In one embodiment, such an interface can include methods as listed in Table 2. The methods can include as arguments a location in a source code file/program at or near which code completion can be applied. In one embodiment, the location can be an textual offset (e.g., a character count) into a program. Textual offsets are merely one technique for indicating a location within a program. As is apparent to those of skill in the art, a location may also be specified by structural navigation through a parse tree, via indication of semantic entities within the program, through a token or token range within the lexical stream, and so forth. The framework can map the method to a language model associated with the source code at the specified location. The language module can provide some or all of the information requested by the method to the framework. The framework can then provide this information to the client that requested it.

The program location provided to the method can be mapped to a location in a language module's parse tree. The location in the parse tree will potentially refer to a complete or incomplete name of some kind (e.g., a package or library name, a class name, a method name, a field name, a variable name). The language module can use information in the parse tree in conjunction with information in the name space to generate a list of possible code completions. This information can then be interactively presented to an end-user by a client.

TABLE 2

Code Completion Services in one Embodiment

| CODE COMPLETION METHOD | DESCRIPTION |
| --- | --- |
| getCompletionRange(location) | Returns to a client the range in a programprogram that holds the current value of the completion that has been chosen by an end-user or the client. |

TABLE 2-continued

Code Completion Services in one Embodiment

| CODE COMPLETION METHOD | DESCRIPTION |
| --- | --- |
| getCompletions(location) | Returns all of the possible objects (e.g., classes, methods, fields, functions, variables, etc.) whose names could be used in place of the identifier at the given location in the programprogram (or that would be at the given location). |
| getEnclosingConprogram(location) | Returns information about the enclosing conprograms of the given program location. By way of a non-limiting example, this method could return the name of enclosing method, function or class definitions. |
| getIdentifierInfo(location) | Returns name space information pertaining to the identifier at the given program location. |
| getRange(location, symbol) | Returns the start location of the given symbol, which was returned from querying about the given location. |
| isCompletionChar(location, character) | Determines whether the given character, just typed, should initiate an attempt at completion (after a pause). |

Clients can provide code completion services to end-users in a number a ways, including but not limited to, via pop-up windows/menus, status displays, key and/or mouse click sequences, sounds and other suitable means. By way of a non-limiting example, a client could present the user with a pop-up window containing a list of possible code completions. As the user enters more text, the list could shrink to include only those completions that are still valid in light of the newly entered text. If a client allows an end-user to select a given code completion, the client can automatically insert this information into the source code, thus completing the code.

Figure 7:
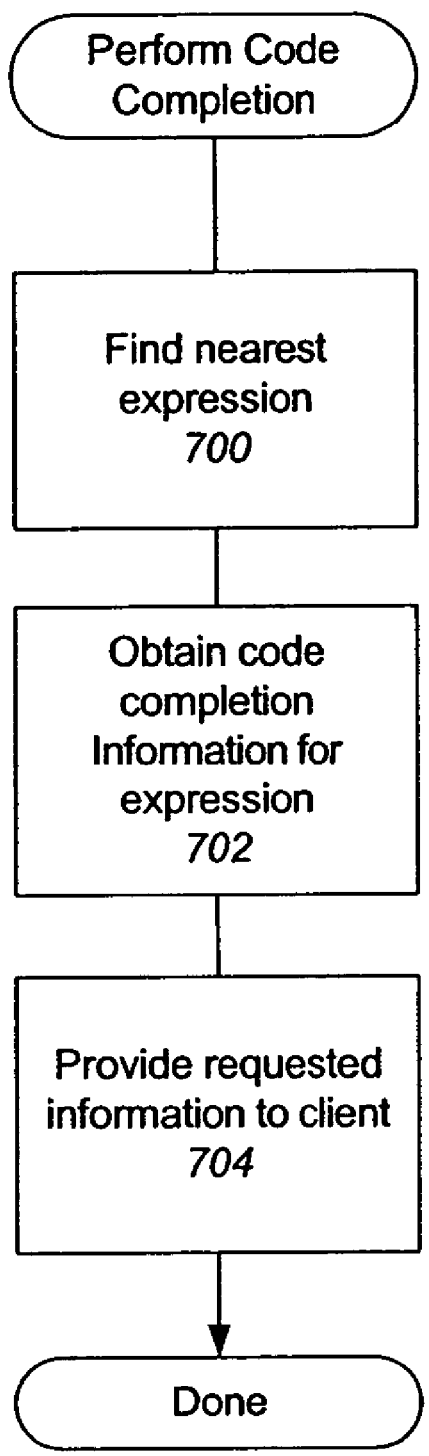
FIG. 7 is an illustration of code completion in one embodiment.

FIG. 7 is an illustration of code completion in one embodiment. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways. In Step 700, a language module finds the nearest expression to the specified program location in its parse tree. In Step 702, the language module and/or framework obtains code completion information relevant to the expression from the parse tree itself and/or the name space. In Step 704, the code completion information can be provided to a client.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A method for code completion compiler error recovery while creating software code in an integrated development environment, comprising:
    parsing the syntactic structure of a first program in a first programming language, wherein the first program can be represented by a first set of tokens;
    detecting a syntax error in the first program;
    correcting the syntax error by adding at least one token to the first set of tokens according to one of: 1) a prefix, wherein a prefix is the combination of an opening delimiter with a newly created closing delimiter, and 2) an idiom, wherein an idiom is a specific insertion sequence that can be used to overcome common errors in a given programming language; and
    wherein an extensible compiler framework detects the syntax error.

2. The method of claim 1, further comprising:
    correcting the syntax error by removing at least one token from the first set of tokens according to a grammar rule if the syntax error cannot be corrected by adding at least one token to the set of tokens.

3. The method of claim 2 wherein:
    the grammar rule incorporates the syntax error into a grammatical definition of the first programming language.

4. The method of claim 1 wherein:
    the prefix includes an opening delimiter and a closing delimiter.

5. The method of claim 1 wherein:
    the prefix associates an unmatched delimiter with the at least one token.

6. The method of claim 1 wherein;
    the at least one token is an operator if there is no applicable prefix.

7. The method of claim 1 wherein:
    the idiom associates a syntax error with the at least one token.

8. The method of claim 1 wherein the step of remedying the syntax error includes:
    adding a terminator to the first set of tokens.

9. The method of claim 1 wherein:
    the extensible compiler framework can integrate and interact with compilers for different programming languages through a common interface.

10. The method of claim 1 wherein:
    the first program in the first programming language can be nested within a second program in a second programming language.

11. The method of claim 1 wherein;
    a second program in a second programming language is nested within the first program in the first programming language.

12. A method for code completion compiler error recovery while creating software code in an integrated development environment, comprising:
    parsing the syntactic structure of a first program in a first programming language, wherein the first program can be represented by a first set of tokens;
    detecting a syntax error in the first program;
    correcting the syntax error by adding at least one token to the first set of tokens according to one of: 1) a prefix, wherein a prefix is the combination of an opening delimiter with a newly created closing delimiter; and 2) an idiom definition, wherein an idiom is a specific insertion sequence that can be used to overcome common errors in a given programming language; and
    wherein an extensible compiler framework detects the syntax error; and
    wherein the extensible compiler framework can integrate and interact with compilers for different programming languages through a common interface.

13. The method of claim 12, further comprising:
    correcting the syntax error by removing at least one token from the first set of tokens according to a grammar rule if the syntax error cannot be remedied by adding at least one token to the set of tokens.

14. The method of claim 13 wherein:
    the grammar rule incorporates the syntax error into a grammatical definition of the first programming language.

15. The method of claim 12 wherein:
    the prefix includes an opening delimiter and a closing delimiter.

16. The method of claim 12 wherein:
    the prefix associates an unmatched delimiter with the at least one token.

17. The method of claim 12 wherein:
    the at least one token is an operator if there is no applicable prefix.

18. The method of claim 12 wherein:
    the idiom associates a syntax error with the at least one token.

19. The method of claim 12 wherein the step of remedying the syntax error includes:
    adding a terminator to the first set of tokens.

20. The method of claim 12 wherein:
    the first program in the first programming language can be nested within a second program in a second programming language.

21. The method of claim 12 wherein:
a second program in a second programming language is nested within the first program in the first programming language.

22. A machine readable storage medium having instructions stored thereon that when executed by a processor cause a integrated development environment code completion system to:
parse the syntactic structure of a first program in a first programming language, wherein the first program can be represented by a first set of tokens;
detect a syntax error in the first program;
correct the syntax error by adding at least one token to the first set of tokens according to one of: 1) a prefix, wherein a prefix is the combination of an opening delimiter with a newly created closing delimiter; and 2) an idiom, wherein an idiom is a specific insertion sequence that can be used to overcome common errors in a given programming language; and
wherein an extensible compiler framework detects the syntax error.

23. The machine readable storage medium of claim 22, further comprising instructions that when executed cause the system to:
correct the syntax error by removing at least one token from the first set of tokens according to a grammar rule if the syntax error cannot be remedied by adding at least one token to the set of tokens.

24. The machine readable storage medium of claim 23 wherein:
the grammar rule incorporates the syntax error into a grammatical definition of the first programming language.

25. The machine readable storage medium of claim 22 wherein:
the prefix includes an opening delimiter and a closing delimiter.

26. The machine readable storage medium of claim 22 wherein:
the prefix associates an unmatched delimiter with the at least one token.

27. The machine readable storage medium of claim 22 wherein:
the at least one token is an operator if there is no applicable prefix.

28. The machine readable storage medium of claim 22 wherein:
the idiom associates a syntax error with the at least one token.

29. The machine readable storage medium of claim 22, further comprising instructions that when executed cause the system to:
add a terminator to the first set of tokens.

30. The machine readable storage medium of claim 22 wherein:
the extensible compiler framework can integrate and interact with compilers for different programming languages through a common interface.

31. The machine readable storage medium of claim 22 wherein:
the first program in the first programming language can be nested within a second program in a second programming language.

32. The machine readable storage medium of claim 22 wherein:
a second program in a second programming language is nested within the first program in the first programming language.

* * * * *